April 22, 1930.  J. T. BERNARD  1,755,909
BRAKE
Filed Aug. 22, 1928  2 Sheets-Sheet 1
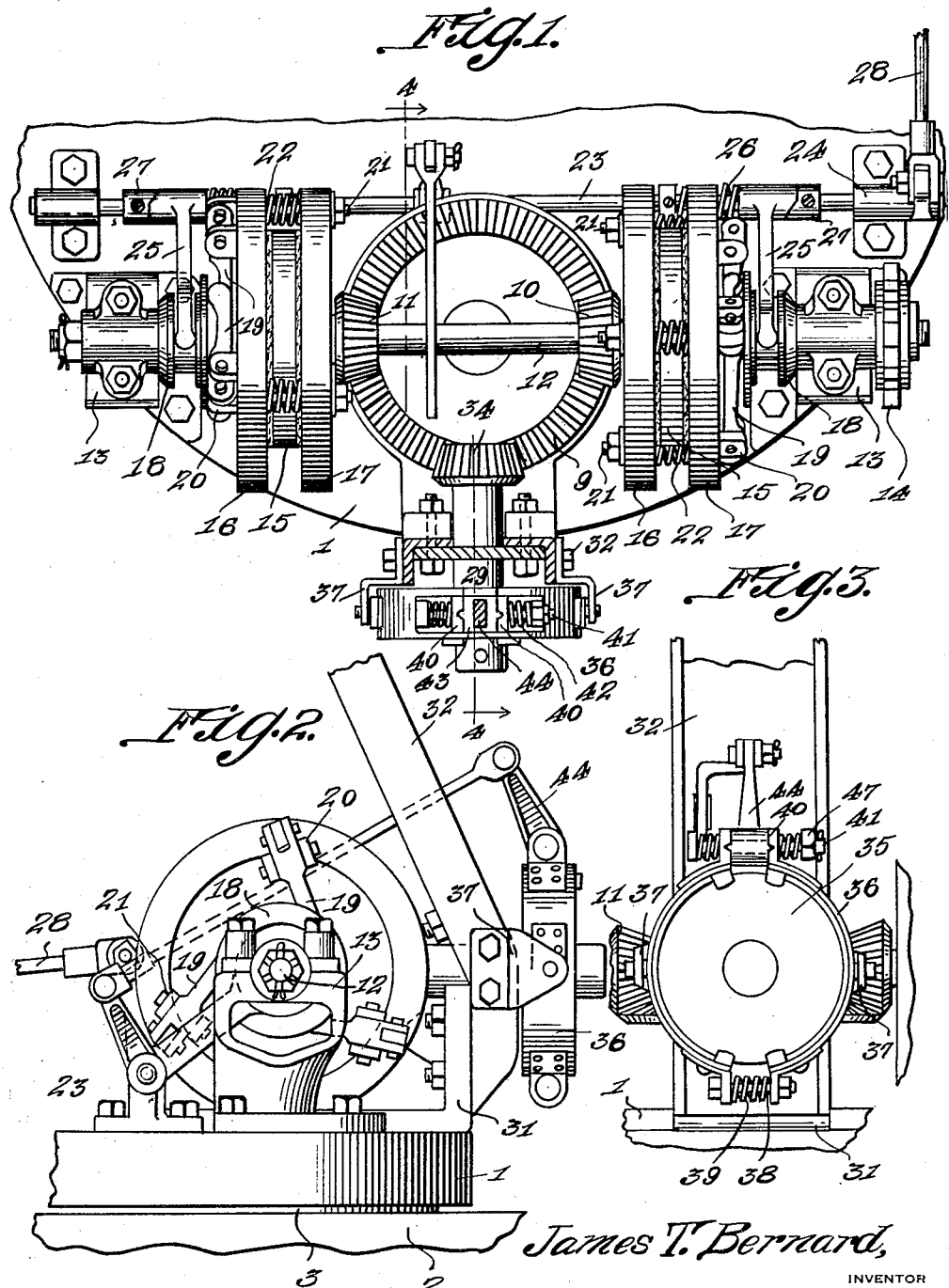
James T. Bernard,
INVENTOR
BY Victor J. Evans
ATTORNEY

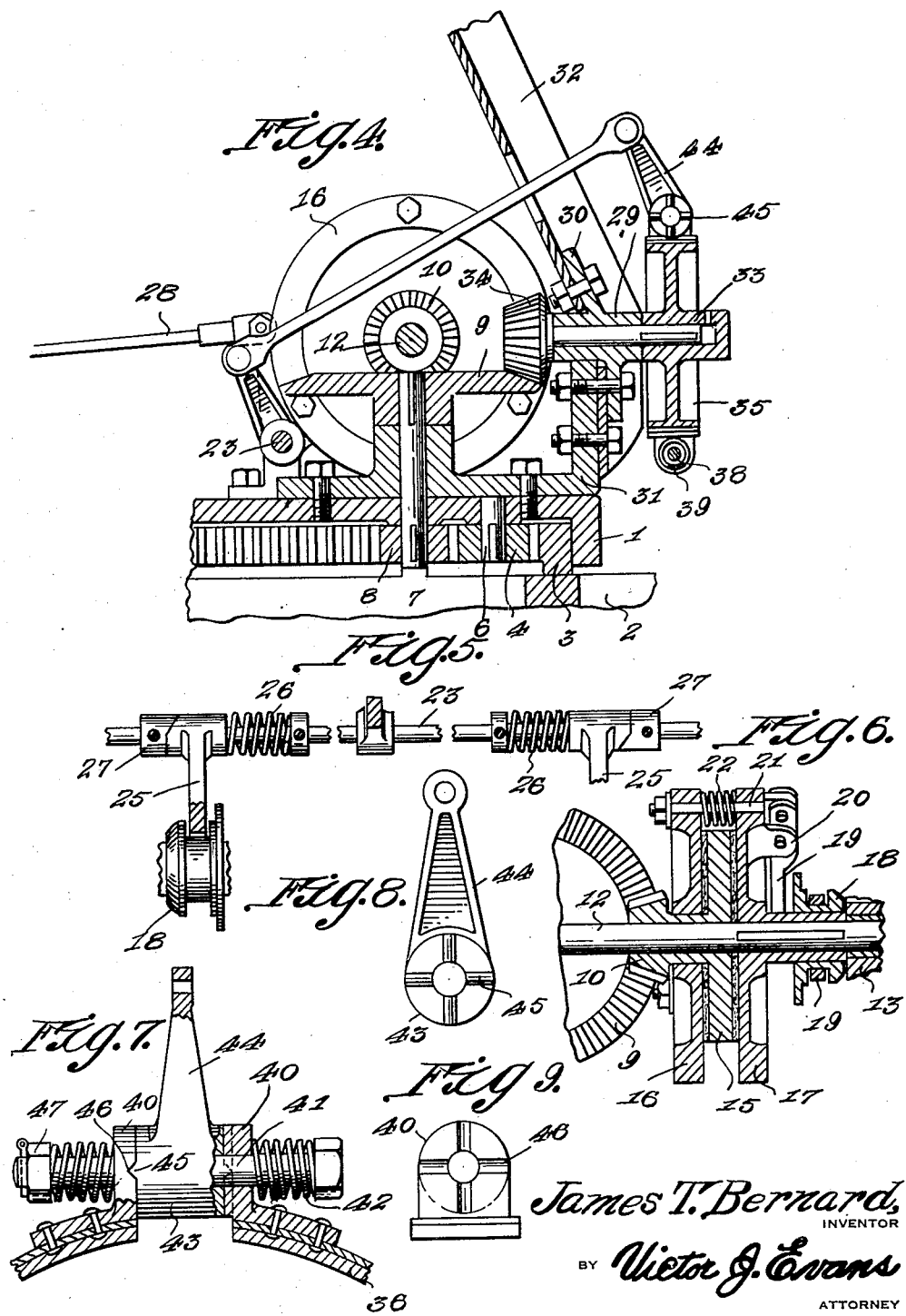

Patented Apr. 22, 1930

1,755,909

UNITED STATES PATENT OFFICE

JAMES T. BERNARD, OF DANVILLE, VIRGINIA

BRAKE

Application filed August 22, 1928. Serial No. 301,395.

This invention relates to brake means for the turntable of a power shovel, the general object of the invention being to provide means for automatically applying the brake when the clutch means, associated with each driving pinion for the turntable is in neutral position so that the turntable will be held against movement when it is disconnected from its driving means and for automatically releasing the brake when either clutch means is in operative position, thus preventing any movement of the turntable and the parts carried thereby when the said turntable is disconnected from its driving means. This invention provides means for automatically applying a brake to the turntable when the table is not being rotated, so that the table cannot move while the apparatus is traveling over rough roads or when the apparatus is resting on a sloping or inclined surface.

Another object of the invention is to so construct and arrange the parts of the invention that they may be applied without changing or interfering with the parts of the shovel as now constructed.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a plan view of part of the turntable of a shovel and the driving means therefor, and showing the invention in use.

Figure 2 is a view looking toward the left side of Figure 1.

Figure 3 is an elevation of the brake means.

Figure 4 is a section on line 4—4 of Figure 1.

Figure 5 is a detail view showing the clutch rod and some of the parts associated therewith.

Figure 6 is a detail sectional view showing one of the clutch assemblies.

Figure 7 is an enlarged detail view showing the means for contracting and expanding the brake band.

Figure 8 is a view of the brake arm.

Figure 9 is a face view of one of the projections on the brake band.

In these views, the numeral 1 indicates a portion of the turntable of a power shovel and 2 indicates a portion of the supporting frame on which the stationary ring gear 3 is supported, the teeth of this gear being engaged by an idle pinion 4 carried by a stub shaft 6 depending from the turntable and a shaft 7 is rotatably supported in the turntable and carries a pinion 8 at its lower end which meshes with the gear 4 so that the rotation of this shaft will cause the table to turn through means of the pinion 4 meshing with the teeth of the ring gear 3. A large beveled gear 9 is fastened to the upper end of the shaft 7 and the beveled pinions 10 and 11 mesh with this gear, these pinions being arranged diametrically opposite each other and are loosely mounted on a shaft 12 supported in the bearing members 13 on the turntable and which has a sprocket 14 on one end which is adapted to be connected by a chain with a power device. Each beveled pinion has a friction disk 15 connected thereto and each disk is placed between a pair of clutch disks 16 and 17, the disk 17 being keyed to the shaft, while the disk 16 is rotatably mounted on the stem of the gear. A grooved collar 18 is slidably mounted on the hollow stem of each disk 17 and when this collar is moved toward the disk, it will actuate the levers 19 pivoted to the brackets 20 on each disk 17 and pivoted to the rods 21 which pass through each pair of the disks 16 and 17 so that the two disks will be caused to move toward each other and thus clamp the disk 15 between them so that the beveled pinion must rotate with the shaft 12 as the disk 17 of each pair is keyed to the shaft. Springs 22 are placed on the rods 21 and lie between the disks 16 and 17 and tend to force the disks apart.

A clutch rod 23 is rotatably supported on the platform through means of the bearing members 24, said rod paralleling the shaft 12 and a pair of clutch arms 25 is rotatably connected with the rod, one arm engaging the collar 18 of the clutch means for the pinion 10 and the other the collar of the clutch means for the pinion 11. Coil springs 26 on the shaft tend to force the arms 25 against the cam collars 27 which are fastened to the shaft 23. The cam collars are so arranged that when the shaft 23 is moved in one direction, one cam collar will cause the arm which it engages to move the clutch means of the pinion 10 into operative position so that said pinion will be driven from the shaft 12, while the other cam collar will not move the other arm 25. When the rod 23 is moved in an opposite direction, the second cam collar will move its arm 25 to throw the clutch means of the pinion 11 into operative position, but the clutch means of the pinion 10 will remain inactive. Thus the turntable can be turned in one direction or the other by moving the shaft 23 in one direction or the other. This shaft 23 is connected to a manually operated member by the link 28. When the shaft 23 is in a central or neutral position, both clutch means are inactive and thus the turntable will not be rotated as it is disconnected from its drive shaft 12. However, it has been found that the turntable will move when the clutch means are inactive, due to the slanting of the frame of the shovel, the travel of the shovel over rough ground, etc., and in order to prevent this movement, I provide brake means for holding the turntable against movement when both clutch means are in inoperative position.

In carrying out my invention, I provide a bearing member 29 which is formed with the flanges 30, one of these flanges being bolted to the vertical part of the member 31 which is placed between the turntable and gear 9 and through which the shaft 7 passes, and the other flange being bolted to the brace 32. A horizontally arranged shaft 33 is journaled in the member 29 and carries a pinion 34 on its inner end which meshes with the gear 9 and a brake drum 35 is fastened to its outer end. The brake band 36 for the drum is formed in two sections, the central portion of each section being connected to the bracket 37 which is fastened to a part of the upright 32, and the lower ends of the two sections are connected together by the bolt 38 and a spring 39 is placed on the bolt between the depending ends of the two sections. The lugs 40, which are connected with the upper ends of the two sections, are perforated to receive the long bolt 41 on which the springs 42 are placed which tend to press the lugs toward each other and thus cause the lining of the brake band to grip the drum. A sleeve-like part 43, formed on an arm 44, is placed on the bolt between the lugs and the ends of this sleeve-like part are formed with the projections or ribs 45, for engaging the grooves 46 formed on the inner faces of the lugs, these parts being so formed that when the projections are engaging the grooves, under the action of the springs 42, the brake band will grip the drum and thus act as a brake for the turntable as the drum will prevent movement of the shaft 33 and its pinion 34 so that this pinion 34 will lock the gear 9 against movement. The springs 42 can have their tension adjusted by means of the nut 47 on the bolt 41.

The arm 44 has its outer end connected with the shaft 23 so that it will be moved with said shaft and the parts are so arranged that when said shaft is in a position with the clutch parts of the gears 10 and 11 in inoperative position, the arm 44 will be in such a position that the springs 42 will contract the brake band and thus apply the brake so as to prevent movement of the turntable, but as soon as the shaft 23 is moved in one direction or the other to move either one of the clutch means in operative position, the arm 44 will be moved to cause its projections 45 to ride out of the grooves 46 and thus expand the band so that the brake will be released and the shaft 29, with its pinion 34 and the brake drum 35 will rotate with the gear 9. Thus I have provided automatic means for applying a brake to the turntable as soon as the turntable is released from its driving means and for releasing the brake when the turntable is connected with its driving means.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In combination with a turntable of a power apparatus and its drive means including a drive shaft on the table, a pair of pinions loosely arranged on the shaft, a vertical shaft passing through the table, a gear on the upper end thereof meshing with the pinions, means for imparting movement to the table from said vertical shaft, clutch means for connecting each pinion to the drive shaft, a clutch shaft which, when rocked in one direction, will operate one clutch means without operating the other means and when rocked in the opposite direction, will operate the second clutch means without operating the first means; a brake shaft journaled on the table, a gear on said brake shaft meshing with the gear on the vertical shaft, a drum connected with the brake shaft, a brake band on the drum, means for normally holding the band contracted and means connected with the rock shaft for expanding the band when the rock shaft is moved to throw either clutch means into operative position.

2. In combination with a turntable of a power apparatus and its drive means including a driven gear for rotating the table, a power shaft having pinions thereon engaging the gear and clutch means including a rock shaft for connecting the pinions, one at a time, to the power shaft, a shaft journaled on the table, a gear on said shaft meshing with the driven gear of the drive means, a drum connected with the shaft, a brake band on the drum, means for normally holding the band contracted, means connected with the rock shaft of the drive means for expanding the band when the rock shaft is moved to throw either clutch means of the drive means into operative position, such means comprising an arm having one end connected with the rock shaft and its other end enlarged and extending between two parts of the band, said parts having grooves therein and the ends of the enlarged part of the arm having projections thereon for engaging the grooves when the band is contracted and expanding the band by moving out of the grooves when the arm is moved by the rock shaft.

In testimony whereof I affix my signature.

JAMES T. BERNARD.